(12) United States Patent
Chang et al.

(10) Patent No.: US 10,244,220 B2
(45) Date of Patent: Mar. 26, 2019

(54) MULTI-CAMERA TIME SLICE SYSTEM AND METHOD OF GENERATING INTEGRATED SUBJECT, FOREGROUND AND BACKGROUND TIME SLICE IMAGES

(71) Applicants: Christopher C. Chang, Pleasanton, CA (US); Joshua Minsung Chang, Pleasanton, CA (US)

(72) Inventors: Christopher C. Chang, Pleasanton, CA (US); Joshua Minsung Chang, Pleasanton, CA (US)

( * ) Notice: Subject to any disclaimer, the term of this patent is extended or adjusted under 35 U.S.C. 154(b) by 124 days.

(21) Appl. No.: 15/425,987

(22) Filed: Feb. 6, 2017

(65) Prior Publication Data

US 2017/0230631 A1 Aug. 10, 2017

Related U.S. Application Data

(60) Provisional application No. 62/291,487, filed on Feb. 4, 2016.

(51) Int. Cl.
| | | |
|---|---|---|
| *H04N 13/106* | (2018.01) | |
| *H04N 13/243* | (2018.01) | |
| *G06T 1/00* | (2006.01) | |
| *H04N 13/111* | (2018.01) | |
| *H04N 13/15* | (2018.01) | |
| *H04N 13/00* | (2018.01) | |

(52) U.S. Cl.
CPC ......... *H04N 13/106* (2018.05); *G06T 1/0007* (2013.01); *H04N 13/111* (2018.05); *H04N 13/15* (2018.05); *H04N 13/243* (2018.05); *H04N 2013/0092* (2013.01)

(58) Field of Classification Search
CPC ............................. H04N 13/15; H04N 13/156
See application file for complete search history.

(56) References Cited

U.S. PATENT DOCUMENTS 9,066,024 B2 * 6/2015 Chang .................... H04N 5/247

* cited by examiner

*Primary Examiner* — Y Lee
(74) *Attorney, Agent, or Firm* — Thomas H. Ham (57) ABSTRACT

A multi-camera time slice system and method of producing a three-dimensional (3D) integrated time slice image array uses multiple cameras to capture a subject to produce an array of subject images with transparent backgrounds. The array of subject images with transparent backgrounds is merged with an array of foreground images with transparent backgrounds and an array of background images, which are captured in a similar manner as the array of subject images, to produce the 3D integrated time slice image array.

15 Claims, 12 Drawing Sheets

Fig. 12

MULTI-CAMERA TIME SLICE SYSTEM AND METHOD OF GENERATING INTEGRATED SUBJECT, FOREGROUND AND BACKGROUND TIME SLICE IMAGES

CROSS REFERENCE TO RELATED APPLICATION

This application is entitled to the benefit of U.S. Provisional Patent Application Ser. No. 62/291,487, filed on Feb. 4, 2016, which is incorporated herein by reference.

BACKGROUND OF THE INVENTION

Multiple cameras can be used to digitally capture a subject, which may be moving, from different points of view to produce time slice or frozen in time images. As an example, the subject may be a golfer executing a swing, and the cameras may be used to capture the golfer in action from different points of view around the golfer at different moments of time. The captured time slice images of the subject can then be used to generate video or interactive software program, such as SWF, HTML, etc., to present the captured subject in creative ways to users. For example, captured images of a golfer in action may be used to generate an interactive software program that allows a user to view the golfer in mid-swing and then to rotate the golfer in mid-swing so that the user can view the golfer in mid-swing from various angles, which produces a three-dimensional (3D) viewing effect.

SUMMARY OF THE INVENTION

A multi-camera time slice system and method of producing a three-dimensional (3D) integrated time slice image array uses multiple cameras to capture a subject to produce an array of subject images with transparent backgrounds. The array of subject images with transparent backgrounds is merged with an array of foreground images with transparent backgrounds and an array of background images, which are captured in a similar manner as the array of subject images, to produce the 3D integrated time slice image array.

A method of producing a 3D integrated time slice image array using a time slice multi-camera system in accordance with an embodiment of the invention includes capturing a subject using a time-slice multi-camera system to produce an array of subject images with chroma key backgrounds, each of the subject images being captured by a specific camera of the first time-slice multi-camera system, executing an image processing operation on the array of subject images with chroma key backgrounds to convert the chroma key backgrounds of the subject images with transparent backgrounds to produce an array of subject images with transparent backgrounds, selecting an array of foreground images with transparent backgrounds from a plurality of arrays of foreground images with transparent backgrounds in response to user input, each of the foreground images with transparent backgrounds corresponding to a particular subject image with a transparent background of the array of subject images with transparent backgrounds with respect to at least camera position, selecting an array of background images from a plurality of arrays of background images in response to another user input, each of the background images corresponding to a particular subject image with a transparent background of the array of subject images with transparent backgrounds with respect to at least camera position, and merging the array of foreground images with transparent backgrounds and the array of background images with the array of subject images with transparent backgrounds to produce the 3D integrated time slice image array such that each integrated image of the 3D integrated time slice image array includes a subject image with a transparent background and a corresponding foreground image with a transparent background from the array of subject images with transparent backgrounds and a corresponding background image from the array of background images.

A multi-camera time slice system in accordance with an embodiment of the invention includes a plurality of cameras positioned about a capture point, a master trigger control device operably connected to the cameras to trigger the cameras to capture images within their field of view, and a computer system connected to the master trigger control device to control the cameras and to the cameras to receive the captured images from the cameras. The computer system includes a processor configured to control the cameras via the master trigger control device to capture a subject to produce an array of subject images with chroma key backgrounds, each of the subject images being captured by a specific camera of the plurality of cameras, execute an image processing operation on the array of subject images with chroma key backgrounds to convert the chroma key backgrounds of the subject images with transparent backgrounds to produce an array of subject images with transparent backgrounds, select an array of foreground images with transparent backgrounds from a plurality of arrays of foreground images with transparent backgrounds in response to user input, each of the foreground images with transparent backgrounds corresponding to a particular subject image with a transparent background of the array of subject images with transparent backgrounds with respect to at least camera position, select an array of background images from a plurality of arrays of background images in response to another user input, each of the background images corresponding to a particular subject image with a transparent background of the array of subject images with transparent backgrounds with respect to at least camera position, and merge the array of foreground images with transparent backgrounds and the array of background images with the array of subject images with transparent backgrounds to produce a 3D integrated time slice image array such that each integrated image of the 3D integrated time slice image array includes a subject image with a transparent background and a corresponding foreground image with a transparent background from the array of subject images with transparent backgrounds and a corresponding background image from the array of background images.

Other aspects and advantages of the present invention will become apparent from the following detailed description, taken in conjunction with the accompanying drawings, illustrated by way of example of the principles of the invention.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1A:
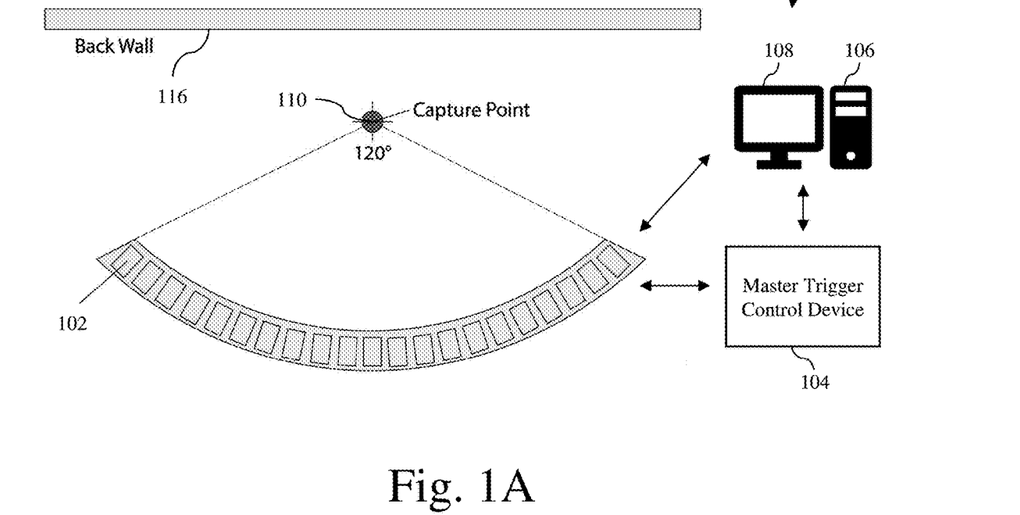
FIG. 1A is a top view of a multi-camera time slice system in accordance with an embodiment of the invention.
Figure 1B:
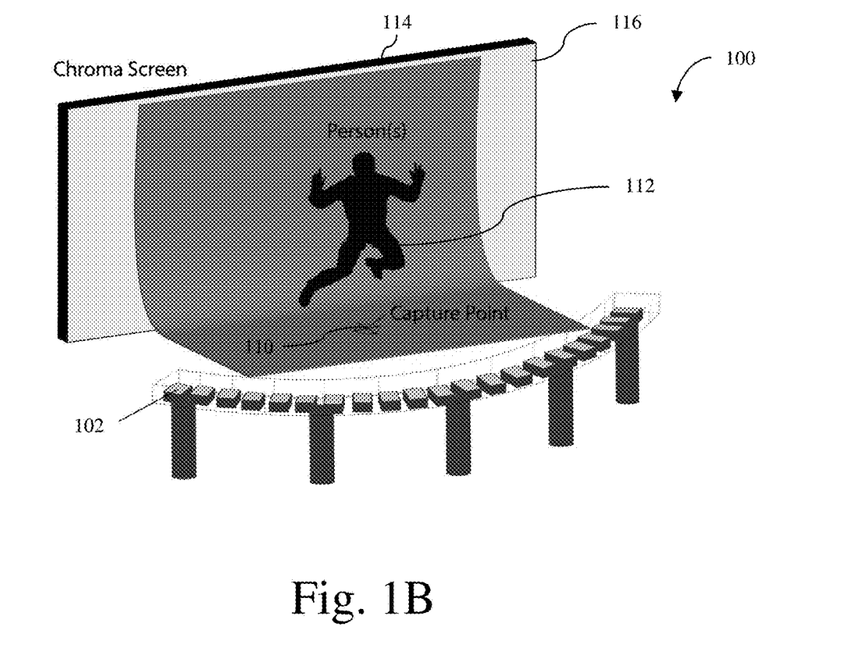
FIG. 1B is a perspective view the multi-camera time slice system shown in FIG. 1A.

With reference to FIGS. 1A and 1B, a multi-camera time slice system 100 in accordance with an embodiment of the invention is described. As shown in FIG. 1, the multi-camera time slice system includes a number of cameras 102, a master trigger control device 104, and a computer system 106 with a display 108. The master trigger control device 104 and the computer system 106 are not shown in FIG. 1B. The cameras 102 are arranged in periodic positions focused on a capture point 110, where a subject can be situated so that the cameras can capture images of the subject. In an embodiment, the cameras 102 are positioned around the capture point 110 in a semicircular arrangement. In addition, each camera 102 is orientated to point at the capture point 110 so that a subject at the capture point would be in the field of view of that camera. The subject, which may be a person or persons, may perform an action, such as jumping or kicking, which is then captured by each camera 102 simultaneously or sequentially from varying camera positions and angles. The multi-camera time slice system 100 may include any number of cameras about the capture point 110. In a particular implementation, the multi-camera time slice system 100 includes 34 cameras, which are positioned approximately 3 meters+/−0.5 meter from the capture point 110. As illustrated in FIG. 1, the cameras 102 of the multi-camera time slice system 100 should be within about 120°+/−10° from the capture point 110 so that none of the cameras are within the field of view of any of the cameras.

The cameras 102 of the multi-camera time slice system 100 can be any type of cameras that can electronically capture images of objects within their field of view. In the illustrated embodiment, the cameras 102 may be digital still cameras, such as digital single-lens reflex (SLR) cameras, e.g., Canon Rebel and Nikon D3000 digital SLR cameras. In another embodiment, the cameras 102 may be digital video cameras, which may be able to take still images. The cameras 102 include wired or wireless trigger interfaces (not shown) so that each of the cameras can be triggered to capture an image when a trigger signal is transmitted to that camera. If the cameras 102 include wired trigger interfaces, the cameras are connected to the master trigger control device 104 by wires.

The master trigger control device 104 is configured to transmit trigger signals to the cameras 102 so that the cameras can simultaneously or sequentially capture images of a subject at the capture point 110. The master trigger control device 104 is controlled by the computer system 106, and thus, transmits the trigger signals to the cameras 102 in response to instructions from the computer system, which may involve one or more control signals being sent to the master trigger control device from the computer system.

Figure 2A:
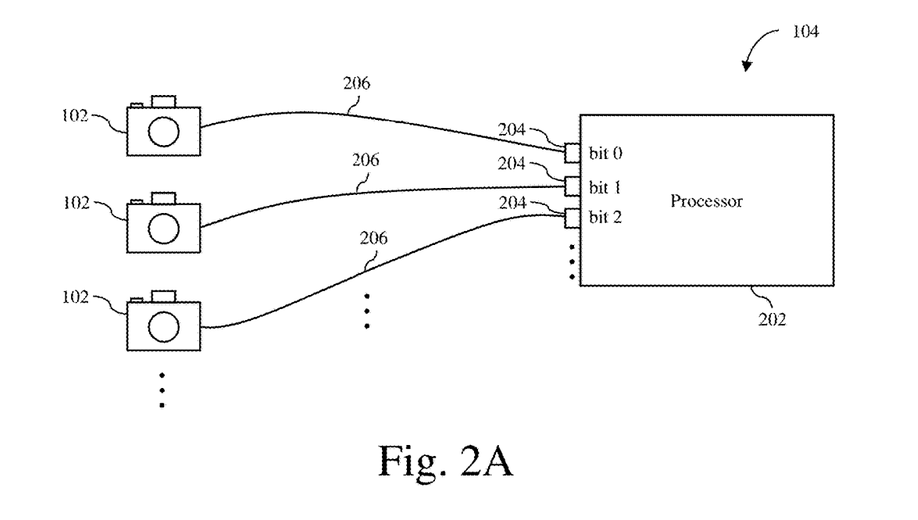
FIGS. 2A and 2B show a master trigger control device of the multi-camera system in accordance with different embodiments of the invention.

In one implementation, as illustrated in FIG. 2A, the master trigger control device 104 is configured to directly output trigger signals to each of the cameras 102. In this implementation, the master trigger control device is a processor 202 with a number of ports 204, which are connected to the cameras 102 via wires 206. The processor 202 can be any type of a processor. The processor 202 may be a general-purpose digital processor, such as a microprocessor or microcontroller. In other embodiments, the processor 202 may be a special-purpose processor, such as a digital signal processor. In still other embodiments, the processor 202 may be another type of controller or a field programmable gate array (FPGA). In operation, the processor 202 outputs trigger signals as bits of data to the ports 204, which are then transmitted to the individual cameras 102 through the wires 206. As illustrated in FIG. 2A, different bits, e.g., bit 0, bit 1, bit 2, etc., are outputted to different ports 204 to trigger the cameras 102 connected to the respective ports. Thus, in this implementation, the master trigger control device 104 can selectively trigger one or more of the cameras for any moment of time using bits of data.

Figure 2B:
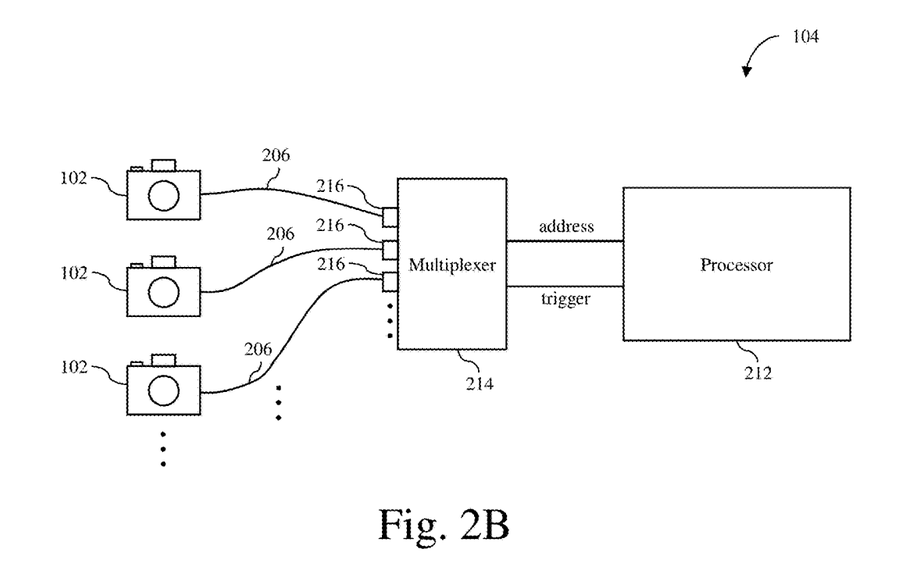

In another implementation, as illustrated in FIG. 2B, the master trigger control device 104 is configured to output trigger signals to the cameras 102 using multiplexing. In this implementation, the master trigger control device includes a processor 212 connected to a multiplexer 214, which includes a number of ports 216 that are connected to the cameras via the wires 206. The processor 212 can be any type of a processor. The processor 212 may be a general-purpose digital processor, such as a microprocessor or microcontroller. In other embodiments, the processor 212 may be a special-purpose processor, such as a digital signal processor. In still other embodiments, the processor 212 may be another type of controller or a FPGA. In operation, the processor 212 sends address data and a trigger signal to the multiplexer 214. The address data indicates which ports 216 should be used to transmit the trigger signal to the cameras 102 so that one or more of the cameras can be selectively triggered to capture images.

Turning back to FIG. 1A, the computer system 106 is connected to the master trigger control device 104 to control the transmission of the trigger signals to the cameras 102 from the master trigger control device. The computer system 106 may also connected to the cameras 102 to receive the digital images captured by the cameras. In an embodiment, the computer system 106 may be connected to the cameras 102 using wires. However, in other embodiments, the computer system 106 may be wirelessly connected to the cameras 102, using, for example, WiFi SD (or SDHC) cards in the cameras. The computer system 106 can be any type of computer system that includes one or more processors and memory. In an embodiment, the computer system 106 may be a personal computer. The computer system 106 may include one or more software programs to control the triggering of the cameras 102 via the master trigger control device 104 and to receive and process the captured images from the cameras. These software programs may also be used to set image-capturing parameters of the cameras 102. Although the master trigger control device 104 and the computer system 106 are illustrated as being separate components, in some embodiments, these components of the multi-camera time slice system 100 may be integrated into a signal device.

As illustrated in FIG. 1B, the cameras 102 of the multi-camera time slice system 100 can be used to simultaneously capture pictures or images of a subject 112 at the capture point 110 from different camera positions and camera angles at one instance or moment of time or to sequentially capture pictures or images of the subject at the capture point from different camera positions and camera angles at different instances or moments of time. The subject 112 may be moving when the images of the subject are captured by the cameras 102. In some embodiments, the subject 112 is captured by the cameras 102 with chroma key background. This may be achieved by using a chroma screen 114 on a back wall 116 or some supporting structure.

Figure 3A:
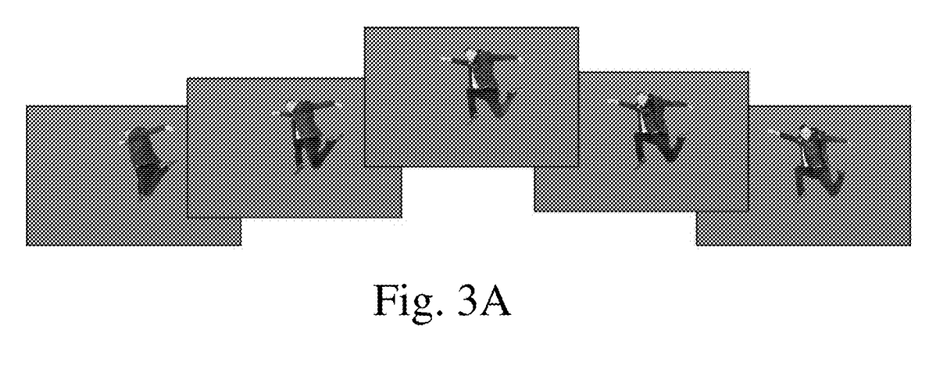
FIG. 3A is an array of subject images with chroma key backgrounds captured by a multi-camera time slice system in accordance with an embodiment of the invention.
Figure 3B:
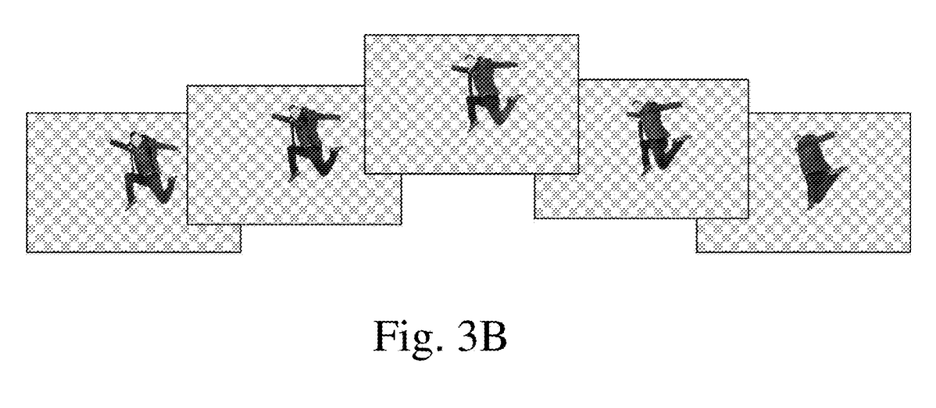
FIG. 3B is an array of subject images with transparent backgrounds produced from the array of subject images with chroma key backgrounds in accordance with an embodiment of the invention.

The result of sequentially capturing images of the subject using the different cameras of the multi-camera time slice system 100 at different instances of time is illustrated in FIG. 3A. As shown in FIG. 3A, the result is a subject image array showing the subject at the different instances of time at different camera angles with chroma key background. Although only 5 subject images are shown in FIG. 3A, the number of images in the array depends on the number of cameras used to capture the subject. Using a common chroma key background removal process, the computer system 106 can detect and convert the chroma key background of the subject images in the array to a transparent background, as illustrated in FIG. 3B. The subject image array with transparent backgrounds can then be combined with a foreground image array with transparent backgrounds and a background image array to produce an array of integrated 3D time slice images, as explained below.

Figure 4A:
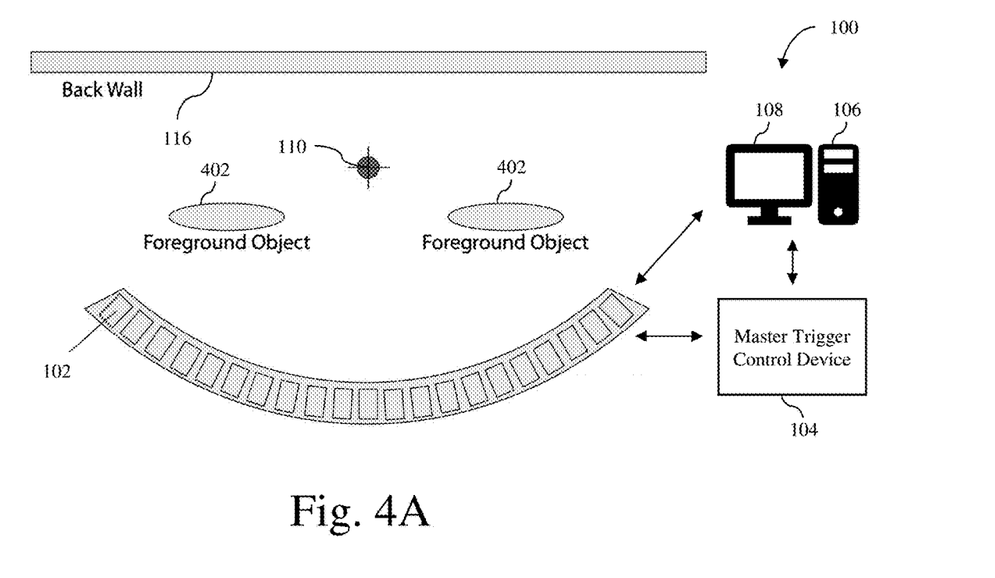
FIGS. 4A and 4B illustrate the multi-camera time slice system being used to capture foreground objects in accordance with an embodiment of the invention.
Figure 4B:
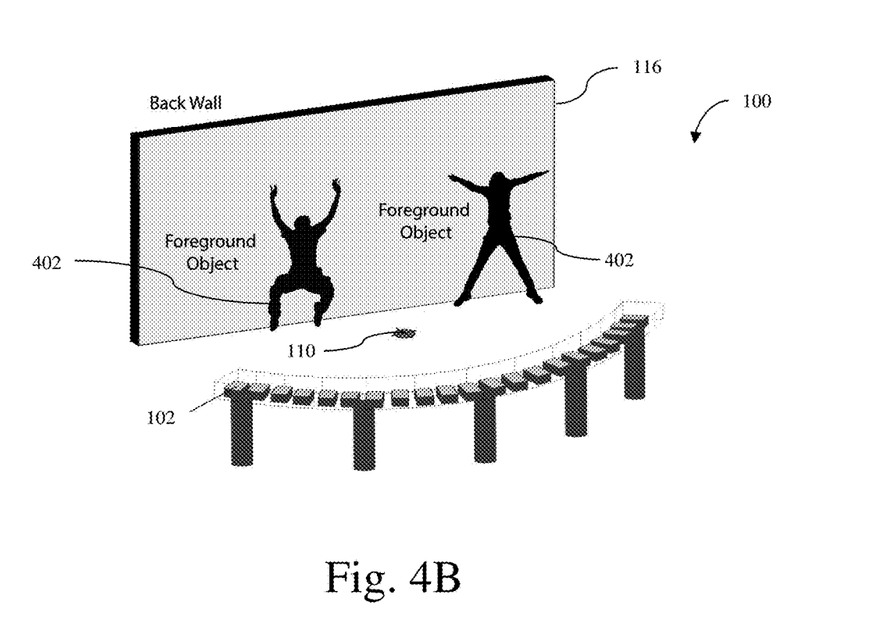

A foreground image array can be captured in a similar manner using the same multi-camera time slice system 100 or a similar multi-camera time slice system with the same number of cameras and the same setup as the multi-camera time slice system 100. FIGS. 4A and 4B illustrate foreground objects being captured using the multi-camera time slice system 100. In FIGS. 4A and 4B, the master trigger control device 104 and the computer system 106 are now shown. As illustrated in FIGS. 4A and 4B, the foreground objects 402 are positioned about the capture point 110 to be captured by the cameras 102 of the multi-camera time slice system 100.

Figure 5A:
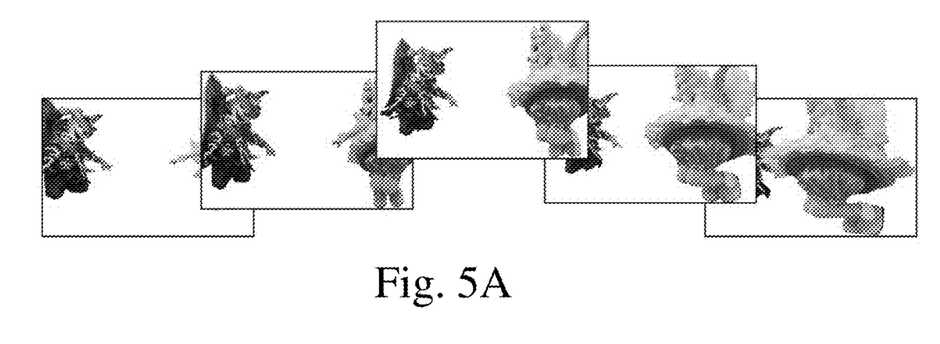
FIG. 5A is an array of foreground images with chroma key backgrounds captured by a multi-camera time slice system in accordance with an embodiment of the invention.
Figure 5B:
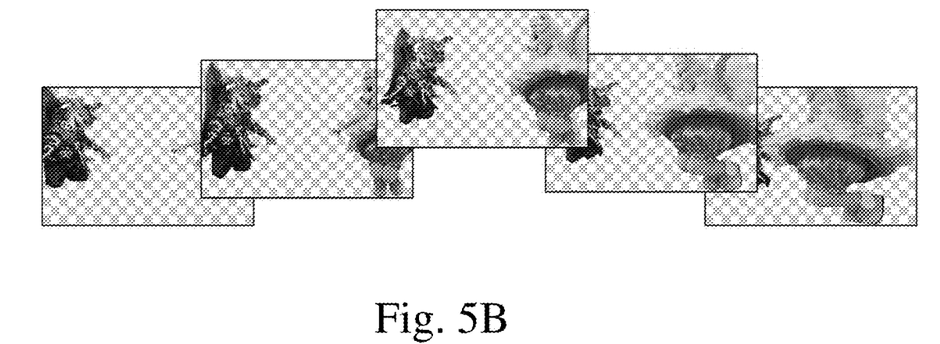
FIG. 5B is an array of foreground images with transparent backgrounds produced from the array of foreground images with chroma key backgrounds in accordance with an embodiment of the invention.

An example of foreground objects captured by the multi-camera time slice system 100 at different instances of time is illustrated in FIG. 5A. As shown in FIG. 5A, the foreground objects are captured as a foreground image array showing the foreground objects at different instances of time at different camera angles and positions with chroma key background. Again, using a common chroma key background removal process, the computer system 106 can convert the chroma key background of the foreground images in the array to a transparent background, as illustrated in FIG. 5B. The foreground image array with transparent backgrounds can then be stored in a database, which may be located locally in the computer system 106 or remotely at a remote storage, such as cloud storage, for future use. Since the foreground image array will be combined with a subject image array, in order to achieve a better realistic effect of foreground placement, the foreground object(s) should be captured at same or similar camera angle and placement with similar lighting conditions so as to appear that the subject and foreground object(s) were captured at the same time.

Figure 6:
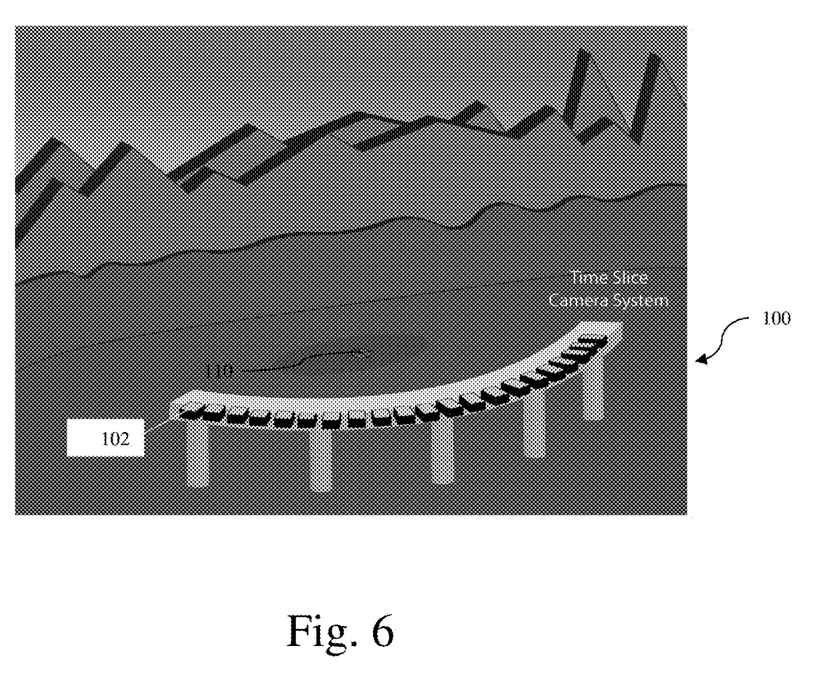
FIG. 6 illustrates the multi-camera time slice system being used to capture a background scene in accordance with an embodiment of the invention.

The background image arrays can also be captured in a similar manner using the same multi-camera time slice system 100 or a similar multi-camera time slice system with the same number of cameras and the same setup as the multi-camera time slice system 100. FIG. 6 illustrates a background scene being captured using the multi-camera time slice system 100. In FIG. 6, the master trigger control device 104 and the computer system 106 are now shown. For capturing a background scene, the back wall 116 and the blue screen 114 are not needed. In an alternative embodiment, a single camera on a rail may be used to sequentially take pictures of a background scene at the different locations of the cameras of the multi-camera time slice system 100 shown in FIG. 6. This is possible since background scenes are not very dynamic, i.e., does not change quickly with respect to time.

Figure 7:
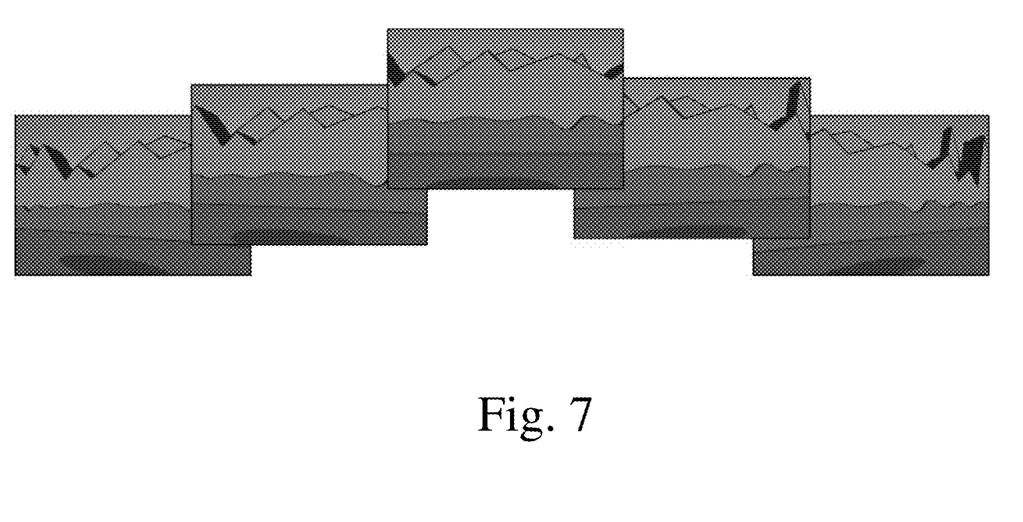
FIG. 7 is an array of background images captured by a multi-camera time slice system in accordance with an embodiment of the invention.

An example of a background scene captured by the multi-camera time slice system 100 at different instances of time is illustrated in FIG. 7. As shown in FIG. 7, the background scene is captured as a background image array showing the background scene at different instance of time at different camera angles and positions. The background image arrays can then be stored in the same database as the foreground image array or in another database for future use. Again, since the background image array will be combined with a subject image array, in order to achieve a better realistic effect of background placement, the background scene may be captured at same or similar camera angle and placement with similar lighting conditions so as to appear that the subject and background were captured at the same time.

Figure 8:
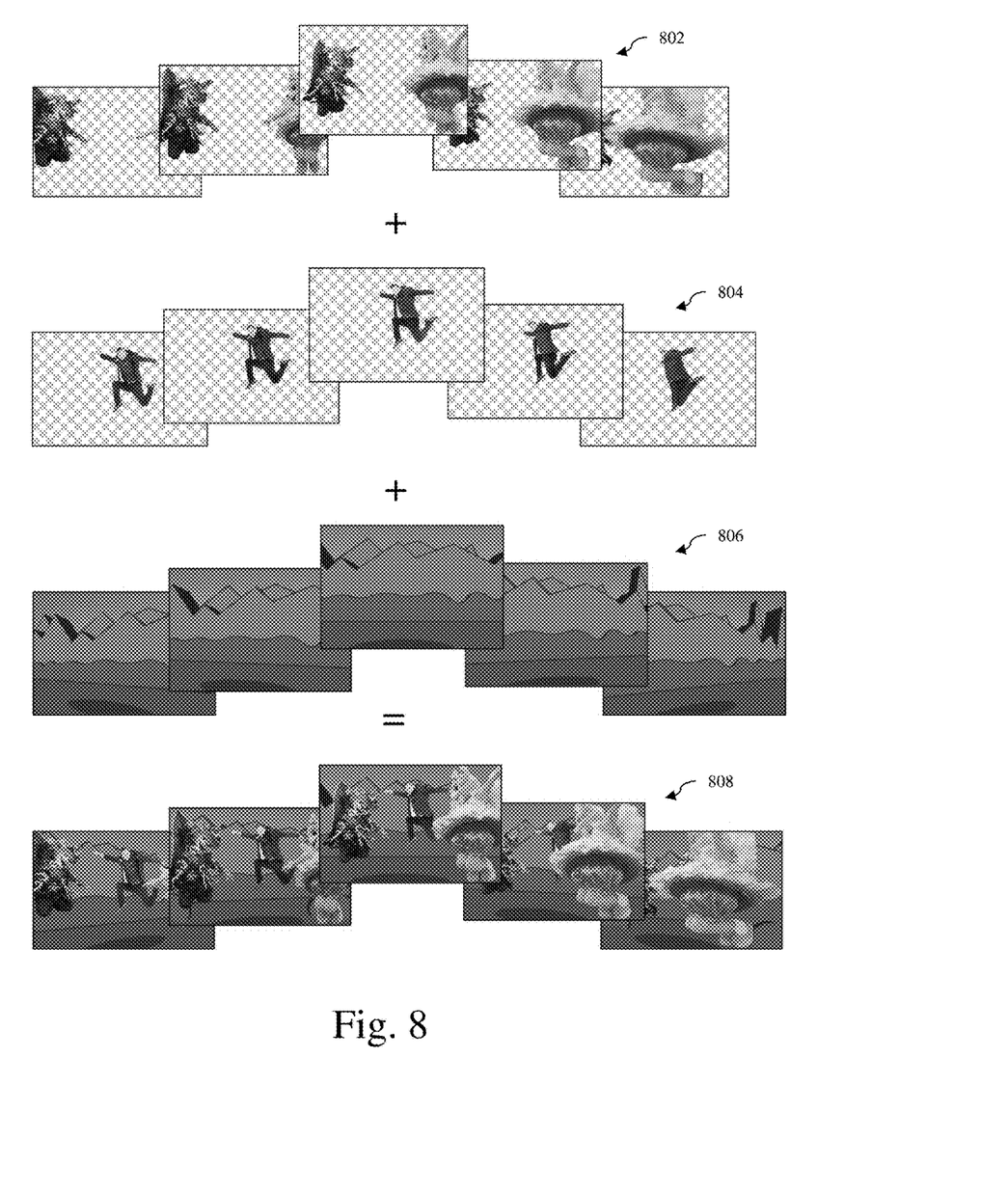
FIG. 8 is an illustration of an image integration process in accordance with an embodiment of the invention is illustrated.

Turning now to FIG. 8, the image integration process that is performed by the computer system 106 of the multi-camera time slice system 100 in accordance with an embodiment of the invention is illustrated. Before capturing a subject image array, a plurality of different foreground image arrays is captured, processed to convert the chroma key backgrounds of the subject images to transparent backgrounds (i.e., no background), and stored in a database. Each of the different foreground image arrays may be captured using the multi-camera time slice system 100 or a similar multi-camera time slice system with the same number of cameras and the same setup as the multi-camera time slice system 100. In addition, a plurality of different background image arrays is captured and stored in the same database or a different database. Each of the different background image arrays may be captured using the multi-camera time slice system 100, a similar multi-camera time slice system with the same number of cameras and the same setup as the multi-camera time slice system 100 or a single camera on a rail that can capture images at the same camera locations of the multi-camera time slice system 100. Before or after the subject image array is captured, a user or a customer selects a particular background scene and a particular foreground object(s) using the display 108 of the computer system 106. As illustrated in FIG. 8, a foreground image array 802 corresponding to the selected foreground object(s), a background image array 804 corresponding to the selected background scene and a subject image array 806 are merged to produce a 3D integrated time slice image array 808, which would include the background scene from different camera angles and camera positions, the foreground object(s) from the same camera angles and camera positions, and the subject from the same camera angles and camera positions. The resulting 3D integrated time slice image array 808 can be used to provide a realistic presentation of the subject, the foreground object(s) and the background that appears to have been captured together at the same time at different viewing angles, which provides a 3D effect. This 3D integrated time slice image array can be stitched together to create a video that shows the subject at varying angles, mimicking a virtual camera moving around the subject slowly moving in time, creating a time slice effect. If each of the subject, the foreground object(s) and the background were captured simultaneously at a single instance of time, then the 3D integrated time slice image array can be stitched together to create a video that shows the subject at varying angles at a single instance of time, mimicking a virtual camera moving around the subject frozen in time.

In some embodiments, the multi-camera time slice system 100 may use an image morphing technology to interpolate images from adjacent cameras 102 to produce additional images. This allows more images to be created or fewer cameras to be used for a specific number of images. As an example, 12 cameras may be used to produce 34 images if two interpolated images can be produced for each pair of images captured by adjacent cameras.

Figure 9:
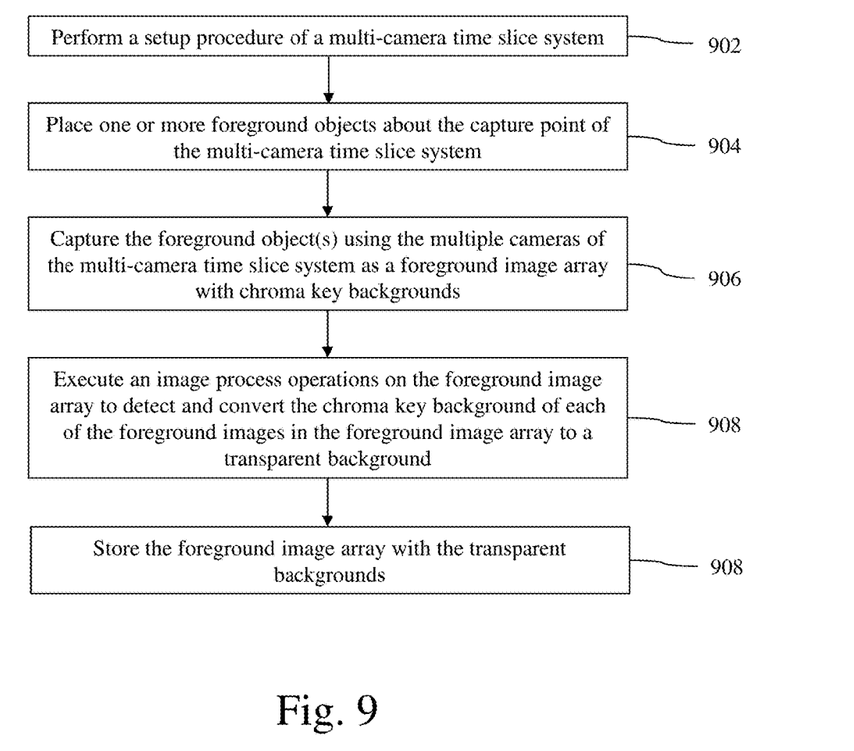
FIG. 9 is a flow diagram of a process of preparing a foreground image array in accordance with an embodiment of the invention.

The process of preparing a foreground image array in accordance with an embodiment of the invention is described with reference to a flow diagram of FIG. 9. At block 902, a setup procedure of a multi-camera time slice system, which may be the multi-camera time slice system 100 or a similar system, is performed. The setup procedure includes calibrating the cameras of the multi-camera time slice system. As an example, the multiple cameras of the multi-camera time slice system 100 may be calibrated using a system and method described in U.S. Pat. No. 9,066,024 and/or PCT Application No. PCT/KR2016/009914, which are both incorporated herein by reference.

Next, at block 904, one or more foreground objects are placed about the capture point of the multi-camera time slice system. The foreground objects may be any objects including people. Next, at block 906, the foreground object(s) are captured using the multiple cameras of the multi-camera time slice system as a foreground image array with chroma key backgrounds. In the simultaneous mode, the foreground object(s) are captured using the multiple cameras of the time slice camera system as a foreground image array for one instance or moment of time. In the sequence mode, the foreground object(s) are sequentially captured using each of the multiple cameras of the multi-camera time slice camera system as a foreground image array for multiple instances or moments of time.

Next, at block 908, an image processing operation is performed on the foreground image array to detect and convert the chroma key background of each of the foreground images in the foreground image array to a transparent background. Next, at block 910, the foreground image array with the transparent backgrounds is stored in a database.

Figure 10:
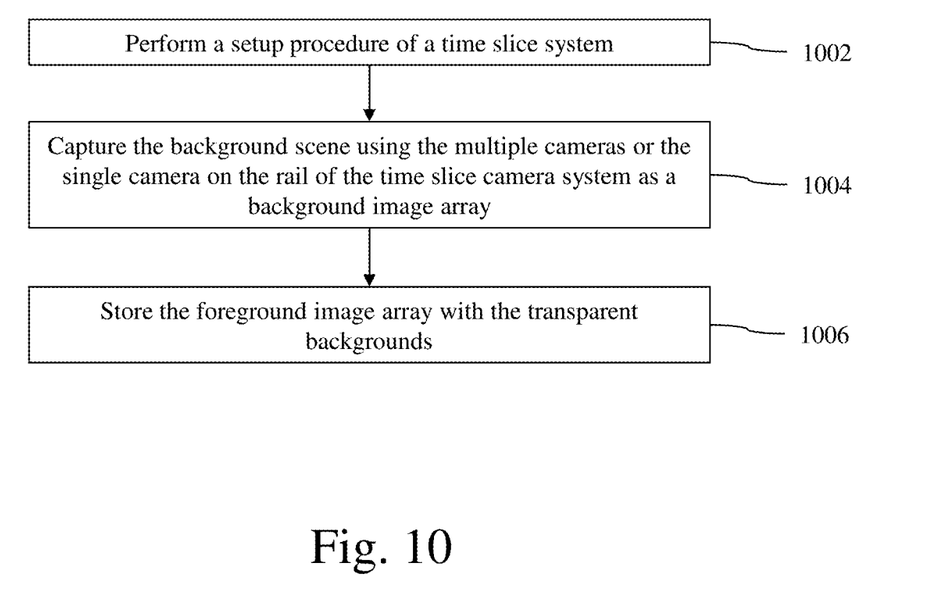
FIG. 10 is a flow diagram of a process of preparing a background image array in accordance with an embodiment of the invention.

The process of preparing a background image array in accordance with an embodiment of the invention is described with reference to a flow diagram of FIG. 10. At block 1002, a setup procedure of a time slice camera system, which may be the multi-camera time slice system 100, a similar system or a time slice camera system with a single camera on a rail, is performed. The setup procedure includes calibrating the cameras of the time slice camera system. Again, if the time slice camera system has multiple cameras, those multiple cameras may be calibrated using a system and method described in U.S. Pat. No. 9,066,024 and/or PCT Application No. PCT/KR2016/009914.

Next, at block 1004, the background scene is captured using the multiple cameras or the single camera on the rail of the time slice camera system as a background image array. In the simultaneous mode for multi-camera time slice camera system, the background scene is captured using the multiple cameras of the time slice camera system as a background image array for one instance or moment of time. In the sequence mode for multi-camera time slice camera system, the background scene is sequentially captured using each of the multiple cameras of the time slice camera system as a background image array for multiple instances or moments of time.

Next, at block 1006, the background image array is stored in the same database as the foreground image array or in another database.

Figure 11:
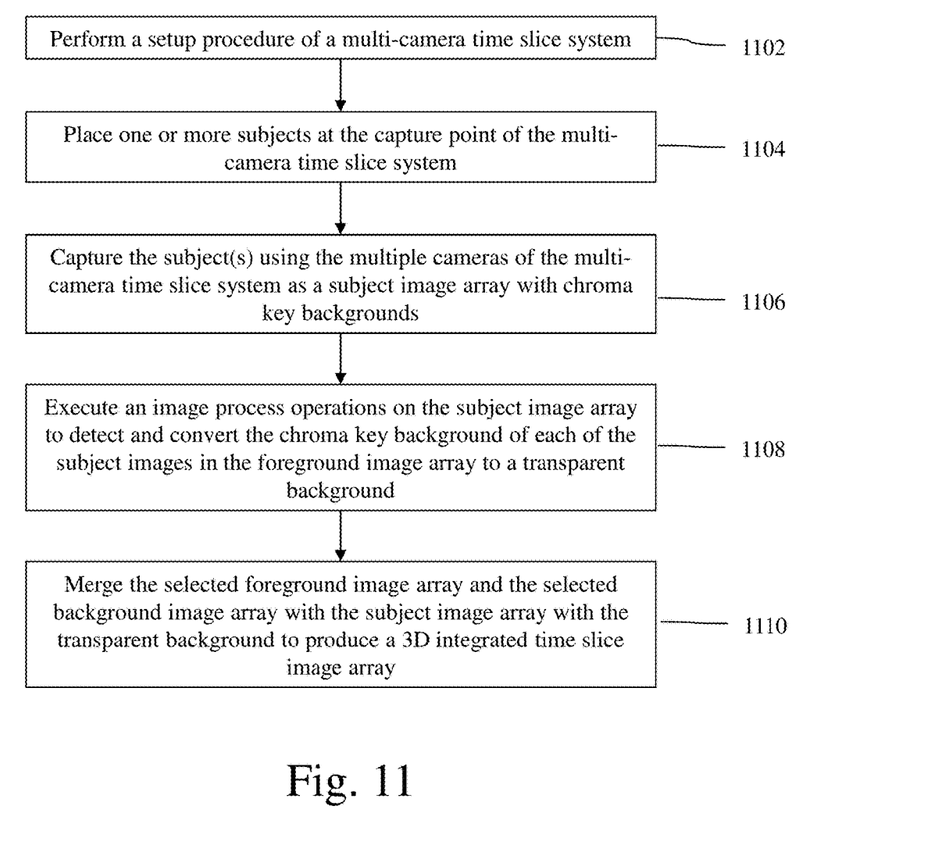
FIG. 11 is a flow diagram of a process of integrating a subject image array with the foreground image array and the background image array to produce a 3D integrated time slice image array in accordance with an embodiment of the invention.

The process of integrating a subject image array with the foreground image array and the background image array to produce a 3D integrated time slice image array in accordance with an embodiment of the invention is described with reference to a flow diagram of FIG. 11. At block 1102, a setup procedure of the multi-camera time slice system 100 is performed. The setup procedure includes calibrating the cameras 102 of the multi-camera time slice system 100. As an example, the multiple cameras 102 of the multi-camera time slice system 100 may be calibrated using a system and method described in U.S. Pat. No. 9,066,024 and/or PCT Application No. PCT/KR2016/009914, which are both incorporated herein by reference.

Next, at block 1104, one or more subjects are positioned at the capture point. Next, at block 1106, the subject(s) are captured using the multiple cameras 102 of the multi-camera time slice system 100 as a subject image array with chroma key backgrounds. In the simultaneous mode, the subject(s) are captured using the multiple cameras 102 of the multi-camera time slice system 100 as a subject image array for one instance or moment of time. In the sequence mode, the subject(s) are sequentially captured using each of the multiple cameras 102 of the multi-camera time slice system 100 as a subject image array for different instances or moments of time.

Next, at block 1108, an image processing operation is performed on the subject image array to detect and convert the chroma key background of each of the subject images in the subject image array to a transparent background. Next, at block 1110, the selected foreground image array and the selected background image array, which were previously captured, are merged with the subject image array with the transparent background to produce a 3D integrated time slice image array. In some use cases, one or more images of the 3D integrated time slice image array may be sold to a customer in a physical form, such as a printed picture or album, or a flipbook. In another use case, the 3D integrated time slice image array may be provided to a customer in an electronic form, via a physical storage medium or Internet download, so that the customer can use the 3D integrated time slice image array on an electronic device using, for example, in a smartphone viewing application.

In other embodiments, the subject image array may only be merged with a selected background image array without a foreground image array. In still other embodiments, the subject image array may only be merged with a selected foreground image array without a background image array. In these embodiments, the subject image array may be captured without the use of a blue screen so that the resulting 3D integrated time slice image array would include the background when the subject image array was captured.

Figure 12:
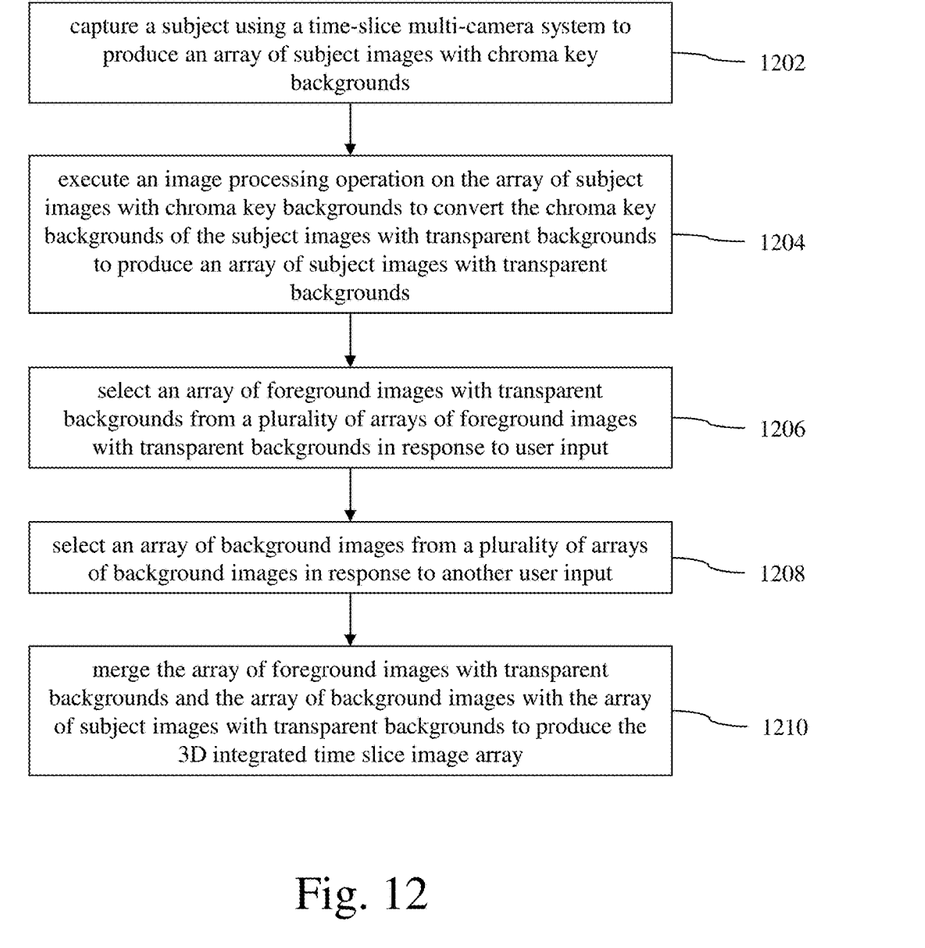
FIG. 12 is a process flow diagram of a method of producing a three-dimensional (3D) integrated time slice image array using a time slice multi-camera system in accordance with an embodiment of the invention.

A method of producing a three-dimensional (3D) integrated time slice image array using a time slice multi-camera system in accordance with an embodiment of the invention is described with reference to the process flow diagram shown in FIG. 12. At block 1202, a subject is captured using a time-slice multi-camera system to produce an array of subject images with chroma key backgrounds, each of the subject images being captured by a specific camera of the first time-slice multi-camera system. At block 1204, an image processing operation is executed on the array of subject images with chroma key backgrounds to convert the chroma key backgrounds of the subject images with transparent backgrounds to produce an array of subject images with transparent backgrounds. At block 1206, an array of foreground images with transparent backgrounds is selected from a plurality of arrays of foreground images with transparent backgrounds in response to user input, each of the foreground images with transparent backgrounds corresponding to a particular subject image with a transparent background of the array of subject images with transparent backgrounds with respect to at least camera position. At block 1208, an array of background images is selected from a plurality of arrays of background images in response to another user input, each of the background images corresponding to a particular subject image with a transparent background of the array of subject images with transparent backgrounds with respect to at least camera position. At block 1210, the array of foreground images with transparent backgrounds and the array of background images are merged with the array of subject images with transparent backgrounds to produce the 3D integrated time slice image array such that each integrated image of the 3D integrated time slice image array includes a subject image with a transparent background and a corresponding foreground image with a transparent background from the array of subject images with transparent backgrounds and a corresponding background image from the array of background images.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blue-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of producing a three-dimensional (3D) integrated time slice image array using a time slice multi-camera system comprising:
    capturing a subject using a time-slice multi-camera system to produce an array of subject images with chroma key backgrounds, each of the subject images being captured by a specific camera of the first time-slice multi-camera system;
    executing an image processing operation on the array of subject images with chroma key backgrounds to convert the chroma key backgrounds of the subject images with transparent backgrounds to produce an array of subject images with transparent backgrounds;
    selecting an array of foreground images with transparent backgrounds from a plurality of arrays of foreground images with transparent backgrounds in response to user input, each of the foreground images with transparent backgrounds corresponding to a particular subject image with a transparent background of the array of subject images with transparent backgrounds with respect to at least camera position;
    selecting an array of background images from a plurality of arrays of background images in response to another user input, each of the background images corresponding to a particular subject image with a transparent background of the array of subject images with transparent backgrounds with respect to at least camera position;
    merging the array of foreground images with transparent backgrounds and the array of background images with the array of subject images with transparent backgrounds to produce the 3D integrated time slice image array such that each integrated image of the 3D integrated time slice image array includes a subject image with a transparent background and a corresponding foreground image with a transparent background from the array of subject images with transparent backgrounds and a corresponding background image from the array of background images;
    capturing at least one foreground object using the time-slice multi-camera system or another time-slice multi-camera system to produce an array of foreground images with chroma key backgrounds;
    executing another image processing operation on the array of foreground images with chroma key backgrounds to convert the chroma key backgrounds of the foreground images with transparent backgrounds to produce the array of foreground images with transparent backgrounds; and
    storing the array of foreground images with transparent backgrounds in a database.

2. The method of claim 1, further comprising:
    capturing a background scene using the time-slice multi-camera system or another time-slice multi-camera system to produce the array of background images; and
    storing the array of background images in the database or another database.

3. The method of claim 1, further comprising:
    capturing a background scene using a camera on a rail at different camera positions to produce the array of background images, the different camera positions of the camera on the rail corresponding to camera positions of the time-slice multi-camera system; and
    storing the array of background images in the database or another database.

4. The method of claim 1, wherein the capturing the subject using the time-slice multi-camera system includes simultaneously capturing the subject using multiple cameras of the time-slice multi-camera system to produce the array of subject images with chroma key backgrounds, wherein each of the subject images with chroma key backgrounds is captured at one particular instance of time.

5. The method of claim 1, wherein the capturing the subject using the time-slice multi-camera system includes sequentially capturing the subject using multiple cameras of the time-slice multi-camera system to produce the array of subject images with chroma key backgrounds, wherein each of the subject images with chroma key backgrounds is captured at a different instance of time.

6. The method of claim 1, wherein multiple cameras of the time-slice multi-camera system are positioned in a semicircular arrangement about a capture point where the subject is positioned when the array of subject images with chroma key backgrounds is captured.

7. The method of claim 6, wherein the multiple cameras of the time-slice multi-camera system are positioned approximately 3 meters from the capture point.

8. The method of claim 7, wherein the multiple cameras of the time-slice multi-camera system are positioned within about 120 degrees from the capture point so that none of the multiple cameras are within the field of view of any of the multiple cameras.

9. A multi-camera time slice system comprising:
    a plurality of cameras positioned about a capture point;
    a master trigger control device operably connected to the cameras to trigger the cameras to capture images within their field of view; and
    a computer system connected to the master trigger control device to control the cameras and to the cameras to receive the captured images from the cameras, the computer system including a processor configured to:
        control the cameras via the master trigger control device to capture a subject to produce an array of subject images with chroma key backgrounds, each of the subject images being captured by a specific camera of the plurality of cameras;
        execute an image processing operation on the array of subject images with chroma key backgrounds to convert the chroma key backgrounds of the subject images with transparent backgrounds to produce an array of subject images with transparent backgrounds;
        select an array of foreground images with transparent backgrounds from a plurality of arrays of foreground images with transparent backgrounds in response to user input, each of the foreground images with transparent backgrounds corresponding to a particular subject image with a transparent background of the array of subject images with transparent backgrounds with respect to at least camera position;

select an array of background images from a plurality of arrays of background images in response to another user input, each of the background images corresponding to a particular subject image with a transparent background of the array of subject images with transparent backgrounds with respect to at least camera position;

merge the array of foreground images with transparent backgrounds and the array of background images with the array of subject images with transparent backgrounds to produce a three-dimensional (3D) integrated time slice image array such that each integrated image of the 3D integrated time slice image array includes a subject image with a transparent background and a corresponding foreground image with a transparent background from the array of subject images with transparent backgrounds and a corresponding background image from the array of background images;

control the cameras via the master trigger control device to capture at least one foreground object to produce an array of foreground images with chroma key backgrounds;

execute another image processing operation on the array of foreground images with chroma key backgrounds to convert the chroma key backgrounds of the foreground images with transparent backgrounds to produce the array of foreground images with transparent backgrounds; and store the array of foreground images with transparent backgrounds in a database.

10. The multi-camera time slice system of claim 9, wherein the processor is further configured to:
control the cameras via the master trigger control device to capture a background scene to produce the array of background images; and
store the array of background images in the database or another database.

11. The multi-camera time slice system of claim 9, wherein the processor is configured to control the cameras via the master trigger control device to simultaneously capture the subject to produce the array of subject images with chroma key backgrounds, wherein each of the subject images with chroma key backgrounds is captured at one particular instance of time.

12. The multi-camera time slice system of claim 9, wherein the processor is configured to control the cameras via the master trigger control device to sequentially capture the subject to produce the array of subject images with chroma key backgrounds, wherein each of the subject images with chroma key backgrounds is captured at a different instance of time.

13. The multi-camera time slice system of claim 9, wherein the cameras are positioned in a semicircular arrangement about the capture point where the subject is positioned when the array of subject images with chroma key backgrounds is captured.

14. The multi-camera time slice system of claim 13, wherein the cameras are positioned approximately 3 meters from the capture point.

15. The multi-camera time slice system of claim 14, wherein the cameras are positioned within about 120 degrees from the capture point so that none of the cameras are within the field of view of any of the cameras.

* * * * *